United States Patent [19]

Meyer

[11] 4,278,371

[45] Jul. 14, 1981

[54] SAFETY INTERLOCK FOR ELECTRO-MAGNETIC DRILL STAND

[75] Inventor: Gary D. Meyer, Waukesha, Wis.

[73] Assignee: Milwaukee Electric Tool Corporation, Brookfield, Wis.

[21] Appl. No.: 125,967

[22] Filed: Feb. 29, 1980

[51] Int. Cl.³ ........ B23B 39/00

[52] U.S. Cl. ........ 408/76; 408/710

[58] Field of Search ........ 408/76, 710

[56] References Cited

U.S. PATENT DOCUMENTS

| | | | |
|---|---|---|---|
| 2,409,397 | 10/1946 | Sheehan et al. | 408/710 |
| 2,887,910 | 5/1959 | Williamson, Jr. | 408/76 |
| 2,932,194 | 4/1960 | Buck | 408/76 |
| 2,977,825 | 4/1961 | Buck | 408/76 |
| 3,371,257 | 2/1968 | Warren et al. | 408/76 |
| 3,814,876 | 6/1974 | Biafore | 408/710 |

*Primary Examiner*—Harrison L. Hinson
*Attorney, Agent, or Firm*—Bayard H. Michael

[57] ABSTRACT

An electromagnetic drill stand, of the type having a drill driven by an electric motor and mounted on a stand provided with an electromagnetic coil in the bottom of the stand to secure the stand to ferromagnetic material when the coil is energized, is provided with switch means preventing operation of the motor when the coil is not energized, said switch means being mounted in proximity to said coil and responsive to the magnetic flux of the coil for controlling the power supply to the motor and operative to interrupt the power supply in absence of a predetermined flux density.

6 Claims, 3 Drawing Figures

SAFETY INTERLOCK FOR ELECTRO-MAGNETIC DRILL STAND

FIELD OF THE INVENTION

Safety interlock for an electromagnetic drill stand supporting an electric drill and provided with an electromagnetic coil which is energized to secure the stand to ferromagnetic material, usually the work piece, the interlock being operative to prevent operation of the drill unless the stand is attached to the ferromagnetic material, and to turn off the drill if the magnet is de-energized during drill operation, and to prevent turning the magnet off during operation of the drill and to prevent automatic restarting of the drill if operation of the drill has been stopped during drill operation, such as by a power interruption.

BACKGROUND PRIOR ART

Electromagnetic drill stands are currently characterized by three approaches to safety interlock of the operation. One approach simply ignores the problem. Another approach utilizes an ineffective interlock using, for example, a magnet switch in series with the motor circuit. This is really a one-way interlock that shuts off the drill if the magnet is de-energized. However, it turns the drill on again when the magnet is re-energized. Unless the drill switch has been mechanically shut off before the magnet is re-energized, unsafe operation will occur. The third approach involves a functional but awkward to use interlock, namely a sequential interlock that requires additional operator actions in order to function. These additional operations by the user become a nuisance and tempt the operator to bypass the interlock in order to remove the nuisance.

SUMMARY OF THE INVENTION

The present interlock circuit overcomes the shortcomings of the prior art by using a fully sequential interlock not requiring the operator to check the status of the interlock or perform any additional operations or actions other than those normally used in the operation of the drill press. The present safety interlock utilizes magnetic flux sensitive switches (reed switches) monitoring the flux generated by the electromagnet. Under normal operating conditions the flux has sufficient strength to close the reed switches. If there is insufficient flux, the reed switch can be made to sense this and de-energize or prevent energizing the electric drill. If the air gap between the stand the the ferromagnetic material is too great or if there is insufficient ferromagnetic material, the reluctance of the circuit becomes too great and the reed switches will not close or remain closed and this will then prevent drill operation until the problem is rectified.

Monitoring the flux of the electromagnet is a positive method of interlocking the controls since the flux is the end product required for the attractive forces and safe operation. Other techniques of the prior art such as sensing voltage or current supplied to the magnet may give false indication of the magnet operation. An open in the circuit when sensing voltage or short of the circuit when sensing current could indicate the magnet is operating while in actuality it is the open or short of the circuit that gives rise to false indication.

DESCRIPTION OF THE PREFERRED EMBODIMENT

Figure 1:
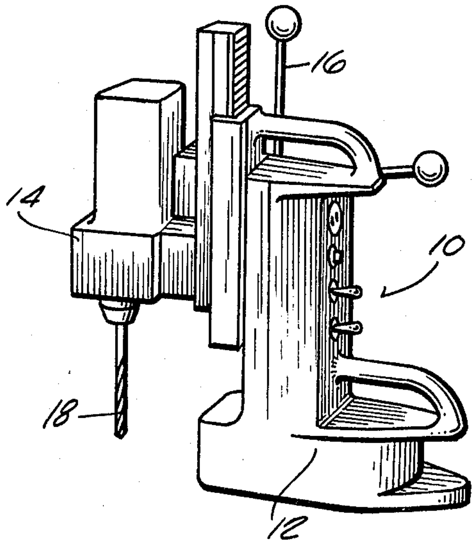
FIG. 1 is a simple perspective view of an electromagnetic drill stand.
Figure 2:
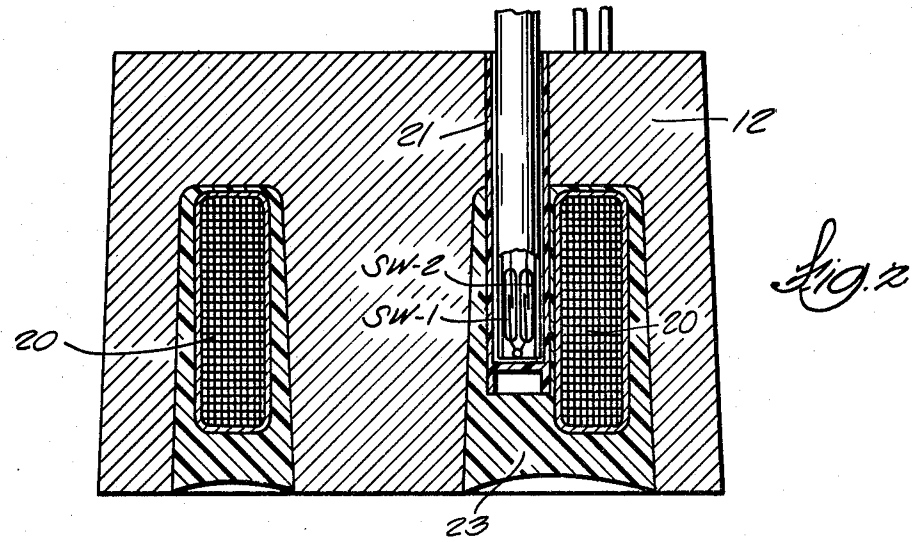
FIG. 2 is a vertical section through the base showing the placement of the reed switches near the coil.
Figure 3:
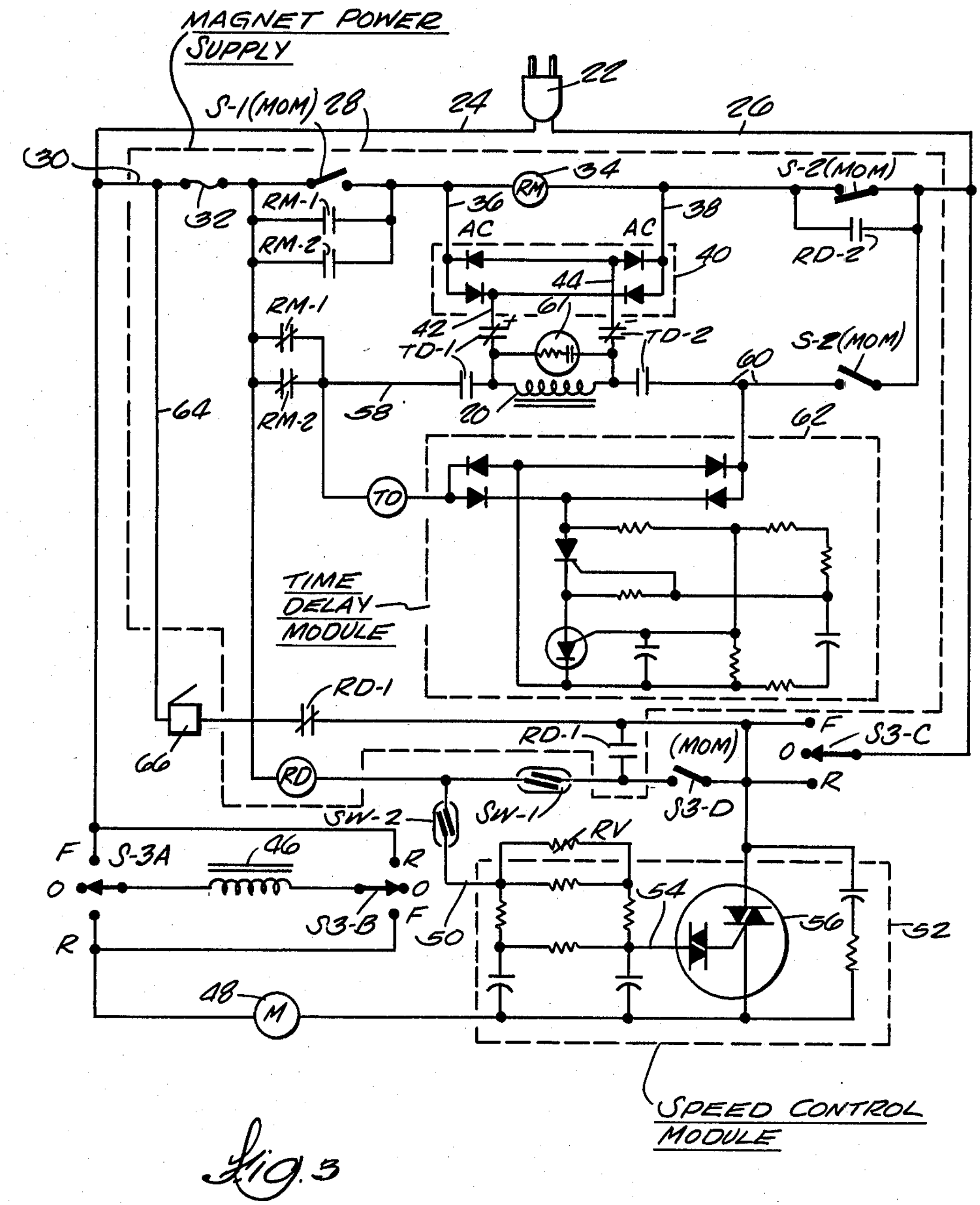
FIG. 3 is a schematic representation of the system failure interlocks.

The electromagnetic drill stand 10 has a base portion 12 in which the electromagnetic coil 20 is mounted to establish sufficient flux density in cooperation with a ferromagnetic work piece (not shown) to secure the stand on the work piece so that as the drill 14 is actuated towards the work by means of the hand wheel 16, the bit 18 will cut into the work piece. The base is provided with a cavity in which coil 20 is mounted with two reed switches SW1 and SW2 adjacent the magnet coil 20 so as to be affected by the flux when the magnet is energized and has adequate clapper iron (ferromagnetic work piece) in proximity to the iron in the stand. Each reed switch is enclosed in a tube 21 to protect it from the (epoxy) encapsulating material 23. When there is enough flux the switches will be actuated. The sensitivity of the reed switches to flux will be affected by their location. The electric plug 22 is plugged into a suitable power supply and has leads 24, 26 for supplying power to the magnet power supply enclosed in the dashed line designaged 28 and to the motor as will appear more fully hereinafter. Lead 24 is connected to wire 30 fused at 32. When momentary switch S-1 is closed, the latching relay 34 will be energized through the normally closed (NC) momentary switch S-2 connected to lead 26. When relay 34, also designated $R_m$, is energized it will close two normally open (NO) switches RM-1 and RM-2 and will also open the NC switches RM-1 and RM-2. Closure of switches RM-1 and RM-2 will shunt the momentary switch S-1 and maintain energization of the relay 34. This will result in AC power being supplied to leads 36 and 38 on either side of relay 34 and respectively connected to leads 24, 26. The AC is supplied to a bridge rectifier 40 with DC power on the output of the bridge rectifier at leads 42, 44 to supply DC power to the magnet coil 20 through the normally closed switches TD-1, TD-2.

When the coil 20 is provided with DC power and when the drill stand is in engagement with a ferromagnetic work piece, there will be adequate magnetic flux to cause the reed switches SW-1 and SW-2 to close. No power will flow as a result of the closure of the reed switches until the latching relay RD is energized when the drill motor switch S3 is actuated. This switch has three positions: off, forward and reverse. As the push button actuator for the switch S3 is depressed, it will first make the electrical circuits at S3A and S3B to establish the direction of current flow through the field coil 46 of motor 48 and will also close the contacts at S3C. The overtravel of the switch as it is actuated will momentarily close switch S3D. When the latter switch is closed, current will flow through the drill latching relay RD and will close the NO switch RD1 and open the NC switch RD1. Closure of the NO switch RD1 serves to shunt the switch S3D so holding current through the drill latching relay RD will be maintained through switch S3C. This will also provide power through reel switch SW2 to the input lead 50 of the speed control module 52. Without going into the details of the speed control module (it is a standard configuration) suffice it to say that there must be voltage on the input lead 50 in order to control the gate 54 of triac 56 to get flow of power through motor 48 through switch S3C to lead 26. Speed is controlled by adjusting potentiometer RV. It is important to remember that if there is no power on input 50, there can be no current flow through the motor 48 and the drill will not operate.

The method of energizing the magnet coil 20 was described above. It will be obvious that if the magnet is not energized to close the reed switches SW1 and SW2, there can be no power supply to the speed control module 52 and the motor cannot be operated. If the magnet is energized and either forward or reverse operation of the motor is selected, switch S3 is actuated accordingly and the momentary switch S3D is actuated to establish flow through the latching relay RD and supply voltage to the speed control module. The drill will now operate. If switch S3 is actuated to "off", the current flow through the drill relay RD is interrupted since the switch S3C returns to the open center contact as illustrated. Since there can be no current flow to the speed control module, the motor stops.

If the operator now wishes to move the drill stand to another location he must first de-energize the magnet and this is done by actuating switch S2 which will open the NC switch S2 and interrupt the power supply to the coil 20. It will be noted that the NO switch S2 is simultaneously closed. This, coupled with the fact that the previously open NC switches RM1 and RM2 are now reclosed, will operate to apply AC voltage to leads 58 and 60 but AC power cannot be supplied to the coil because it is blocked by the NO switches TD1, TD2. These switches are closed when the relay TD is energized. The relay TD cannot be energized until the time delay module 62 acts to close after a one second delay allowing for collapse of the DC field in the magnet coil 20. When the time delay module (a standard piece of electrical hardware) operates, current will flow through the relay TD and close the NO switches TD1 and TD2 and apply AC power across the magnet coil 20 to demagnetize the coil and the adjacent work piece. At the same time the NC switches TD1 and TD2 will open to prevent applying AC to the output of the bridge rectifier.

It should be noted that if the drill motor is operating actuation of the momentary switch S2 will be ineffective and cannot interrupt the power supply to the magnet coil 20 because the momentary switch is shunted by the now closed NO switch RD2 operated by the drill latch relay RD.

Neon glow tube 61 indicates both magnetization of the coil and demagnetization of the coil. It glows when AC or DC is applied across the coil. All of the foregoing is directed to normal operation of the control and the interlock will now be explained in detail. If the drill stand is attached to a work piece with the coil energized but the drill motor is not working, interruption of the power supply will simply de-energize the relay 34 and require that the magnet be re-energized by closure of momentary switch S1. If, however, the power supply is interrupted during operation of the drill, this will result in the magnet and the drill relay RD being de-energized. When the latter is de-energized, the NC switch RD1 will be closed. When power is restored, if during the power interruption the switch S3 was left in either the forward or reverse position, there will be current flow from line 24 and branch 30 through lead 64 to the warning buzzer 66 alerting the operator to the fact there is a dangerous condition. While the buzzer will operate under these conditions, the drill motor cannot operate because the latching relay RD has been de-energized. Therefore, there can be no power supply to input 50 of the speed control module and, therefore, there can be no flow through the module and the motor. Under those circumstances, the operator can either operate switch S3 to "off" so both the magnet and drill are off or he can energize the magnet and then repunch the appropriate forward or reverse button and the momentary overtravel will actuate switch S3D to establish flow through the latching relay RD (the reed switches being closed since the magnet has been energized). The reed switches cannot be closed if the magnet is not energized. Therefore, there is complete safety.

It will be noted that if the drill is operating and there is a power failure, the magnet will be deenergized, as will the drill motor. When power is restored the drill motor cannot be re-energized automatically since there is no flux to actuate the reed switches SW1 and SW2. When the momentary switch S1 is actuated to apply power to the coil 20 the reed switches will close but that will not result in operation of the drill motor which would be a dangerous condition. The operator will be warned of the danger by reason the buzzer being energized through the still-closed circuit through S3C in forward or reverse position. Being thus warned, the operator can either turn the drill switch S3 to off or he can take suitable precautions before reactuating the forward or reverse button which, during its oovertravel, will close the momentary switch S3D and latch the drill relay RD. The warning buzzer will operate whenever the drill switch is mechanically "on" and the magnet is either "on" or "off".

I claim:

1. The combination with an electromagnetic drill stand of the type having a drill driven by an electric motor and mounted on a stand provided with an electromagnetic coil in the bottom of the stand to secure the stand to ferromagnetic material when the coil is energized, of safety means preventing operation of the motor when the coil is not energized comprising, switch means mounted in proximity to said coil and responsive to the magnetic flux of the coil for controlling the power supply to the motor and operative to interrupt the power supply in absence of a predetermined flux density.

2. The combination of claim 1 including power supply means for said coil, magnet de-energizing switch means operative to interrupt said power supply means, and safety means preventing operation of the last named switch means when the drill motor is energized.

3. The combination of claim 2 in which the safety means comprises a safety switch and a relay operating the safety switch, said relay being in circuit with the power supply for said motor, the safety switch shunting the magnet de-energizing switch.

4. The combination of claim 3 including motor switch means controlling the power supply to the motor in circuit with said flux responsive switch means and said relay.

and means preventing re-energization of the relay following loss of power supply to the coil and subsequent re-establishment of the coil power supply.

5. The combination of claim 4 in which the last named means comprises a momentary switch closed only by closure of the motor switch to initiate or re-establish motor operation.

6. The combination of claim 5 including warning means responsive to establishment closure of the motor switch prior to energization of the magnet coil.

* * * * *